(12) United States Patent
Travis

(10) Patent No.: US 7,222,729 B1
(45) Date of Patent: May 29, 2007

(54) CONVEYOR BELT CLAMPING DEVICE AND METHOD

(76) Inventor: Tonny D. Travis, P.O. Box 217, Prosperity, WV (US) 25909

( * ) Notice: Subject to any disclaimer, the term of this patent is extended or adjusted under 35 U.S.C. 154(b) by 0 days.

(21) Appl. No.: 10/966,784

(22) Filed: Oct. 14, 2004

Related U.S. Application Data

(60) Provisional application No. 60/510,918, filed on Oct. 14, 2003.

(51) Int. Cl.
  *B65G 15/62* (2006.01)
  *B25B 25/00* (2006.01)

(52) U.S. Cl. .................. 198/844.2; 198/813; 294/104; 254/199

(58) Field of Classification Search ................ 198/813, 198/844.2, 810.04; 269/238, 268; 254/199; 294/104; 24/134 L
See application file for complete search history.

(56) References Cited

U.S. PATENT DOCUMENTS

| | | | | |
|---|---|---|---|---|
| 3,955,810 A | * | 5/1976 | Travis | 269/238 |
| 4,340,206 A | * | 7/1982 | McJunkin, Jr. | 254/199 |
| 4,500,127 A | * | 2/1985 | Van Derlin | 294/104 |
| 6,068,318 A | * | 5/2000 | Freund | 294/103.1 |

\* cited by examiner

*Primary Examiner*—Mark A. Deuble

(57) ABSTRACT

A clamping device or anchor, at least two of which are used to clamp onto separated sections of a conveyor belt, which sections lie to each side of a repair site in the belt, whereby the belt sections can be pulled together by a power mechanism affixed between the clamping devices, whereby belt tension is relieved at the repair site to allow a repair to be made more easily, wherein each clamping device is provided with a stop shoulder which is adapted to engage an outer edge of the belt as the belt is positioned edgewise between a pair of upper and lower jaws of the device, and wherein the belt contacting portions or surfaces of the jaws are spaced inboard of the stop shoulder from about ¼ inch to about 1.0 inch such that the belt outer edges are not clamped and are not subject to tearing forces.

10 Claims, 4 Drawing Sheets

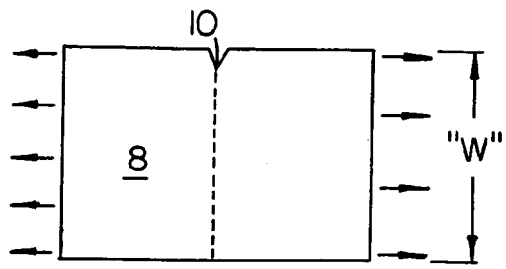
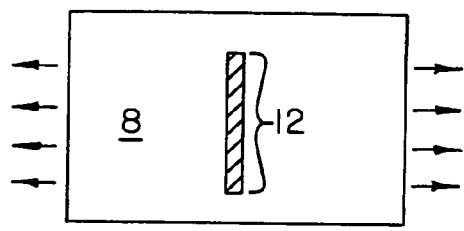
Fig. 1
(PRIOR ART)
Fig. 2
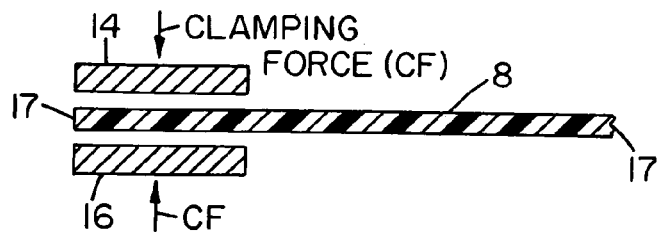
Fig. 3
(PRIOR ART)
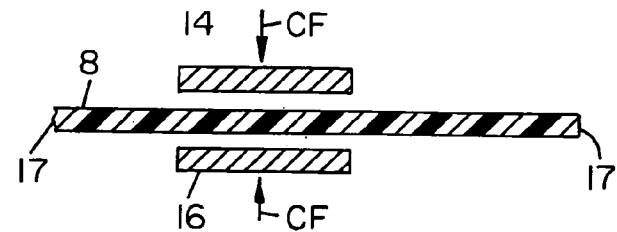
Fig. 4
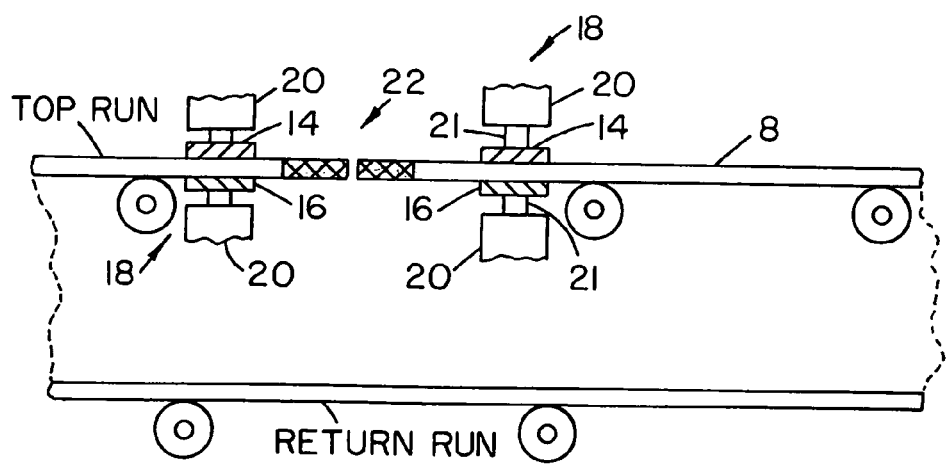
Fig. 5

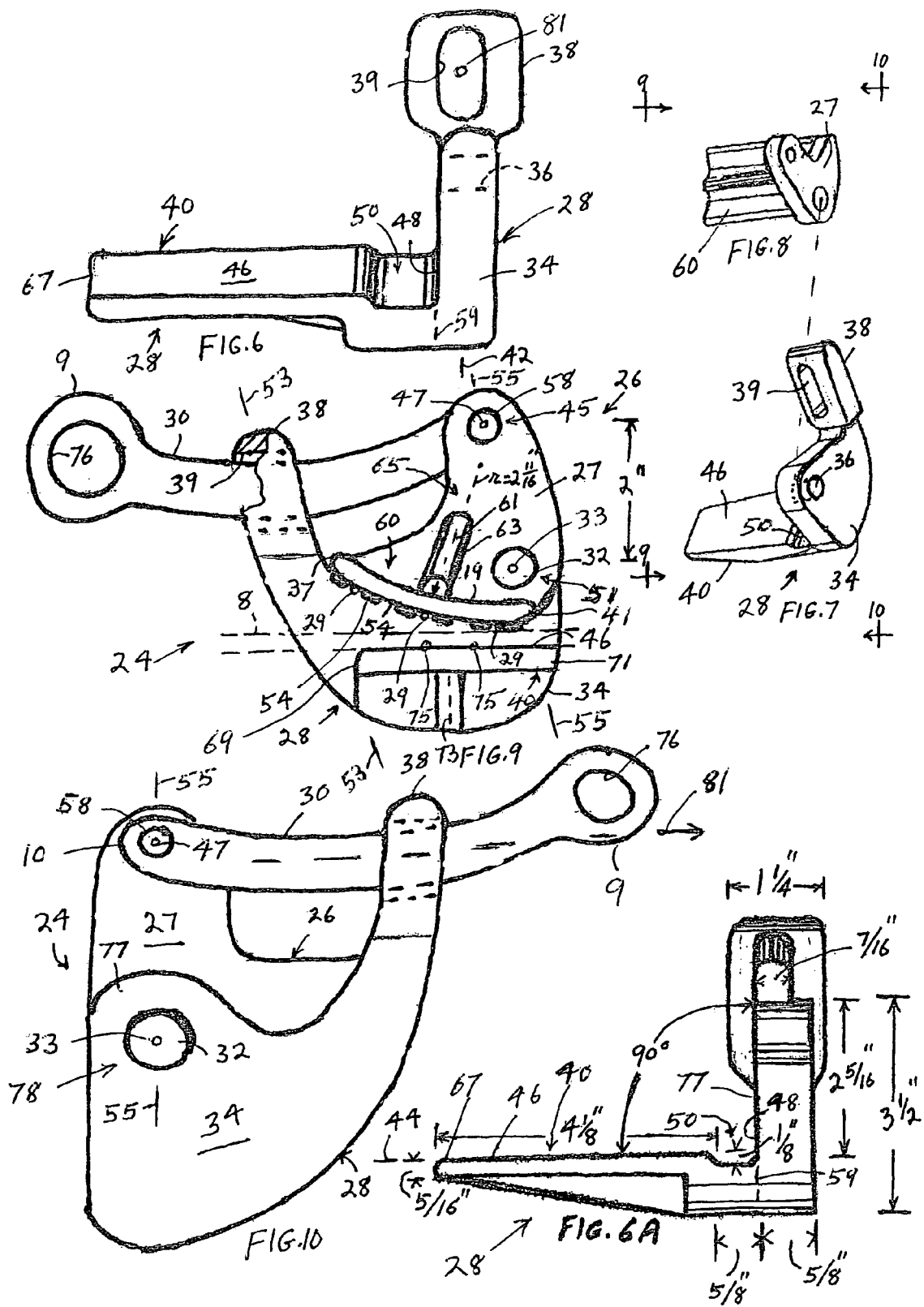

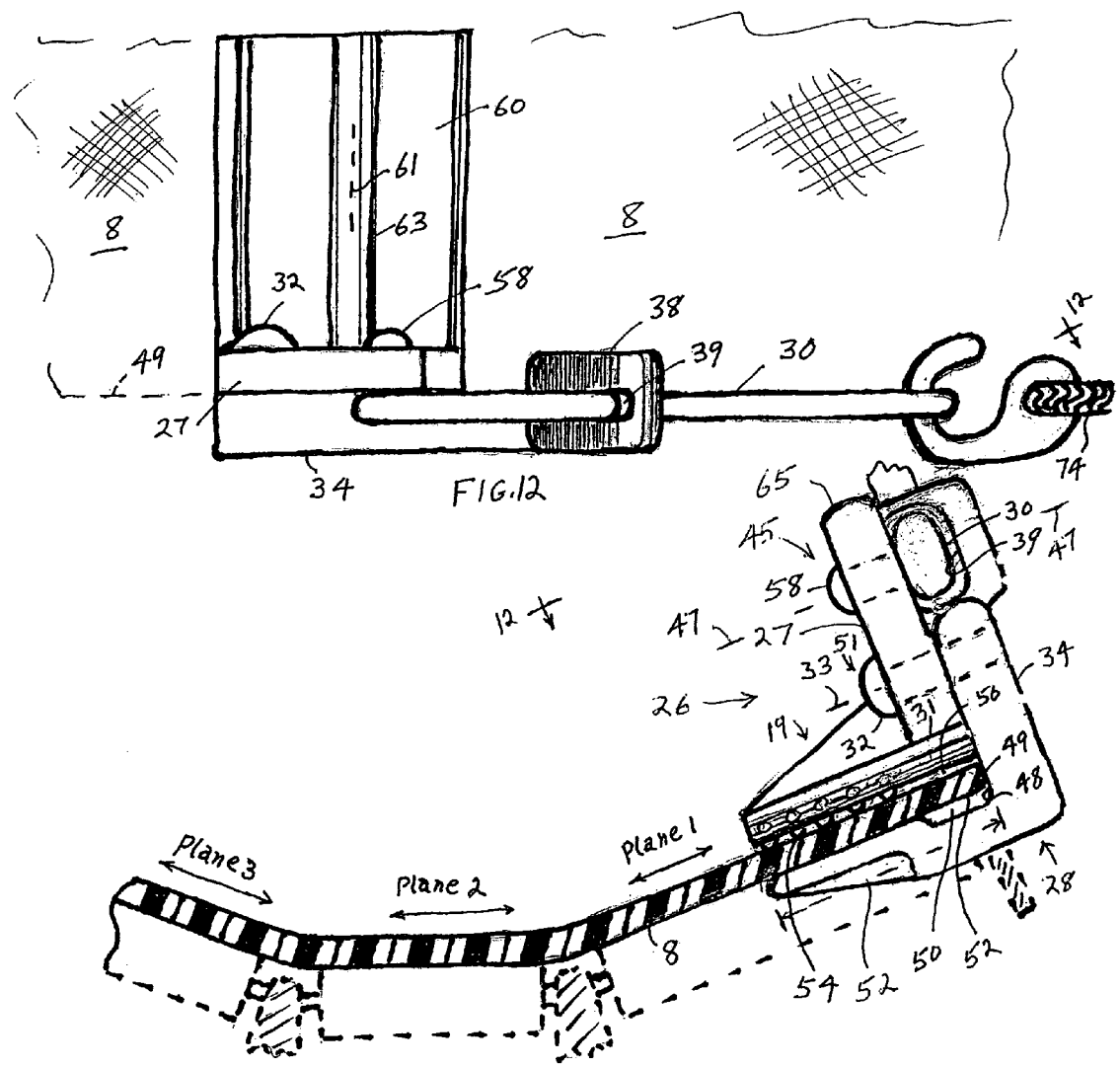

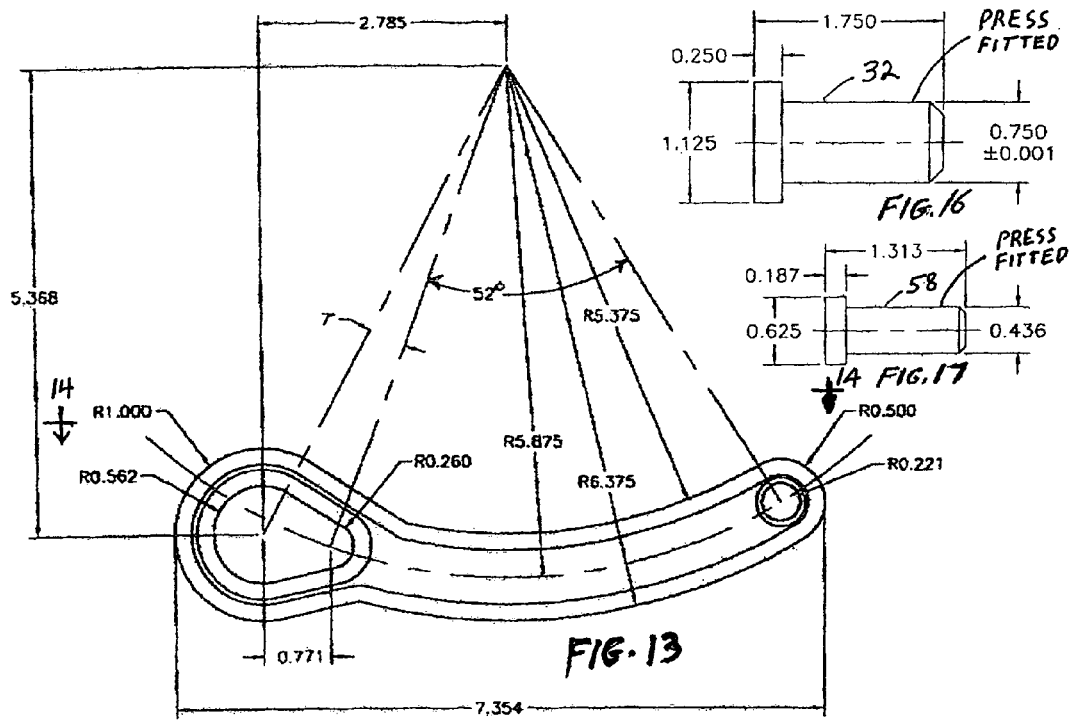
FIG. 13
FIG. 16
FIG. 17
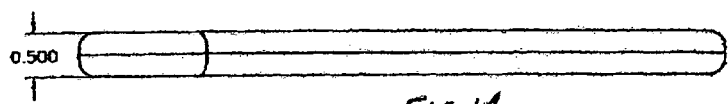
FIG. 14
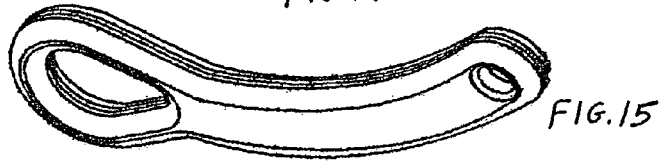
FIG. 15
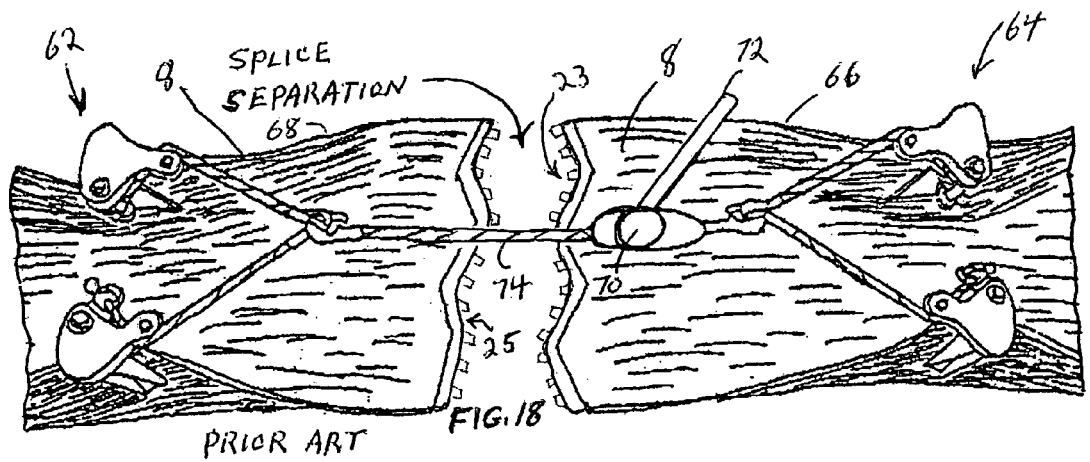
FIG. 18
PRIOR ART

CONVEYOR BELT CLAMPING DEVICE AND METHOD

This application claims priority under 35 U.S.C. 119(e)(1) based on Applicants Provisional U.S. Patent Application Ser. No. 60/510,918 filed Oct. 14, 2003 and titled "CONVEYOR BELT CLAMPING DEVICE".

BACKGROUND OF THE INVENTION

1. Field

Conveyor belts are used in many industries such as for transporting sand, gravel and the like in mining, loading, unloading, and other operations. The belts may be from several feet to miles in length. All such heavy duty conveyor belts from time to time need to be spliced for repair, or a splice remade or damage otherwise repaired, or for other reasons such as planned scheduled maintenance. This requires some way to clamp the belt to prevent tension separation of the splice or repair ends while the belt is under very large tension forces, e.g., several hundred pounds to several tons.

2. Prior Art

There are more conveyor belts in the twenty to one thousand foot lengths than any other lengths and there is a need for light weight, easy to use belt clamps for these lengths of belt. Many types of clamps are on the market ranging in design from wooden boards bolted across the belt on opposite sides of the repair site to complex cam rollers that tighten as they are pulled. All of these prior belt clamps put pressure and direct tension on the belt edges and often start a tear in the belt edge since starting a tear from the edge of the belt is the easiest to do. In this regard, even though the center portions of the belt width are also gripped by the clamp, it is the edge portions which are the most fragile and which fail first under the heavy belt tension forces required during belt splicing or other belt repair.

SUMMARY OF THE INVENTION

In a preferred apparatus embodiment, the invention comprises a clamping device or anchor, at least two of which are used to clamp onto separated sections of a conveyor belt, which sections lie to each side of a repair site in the belt, whereby the belt sections can be pulled together by a power mechanism affixed between the clamping devices, whereby belt tension is relieved at the repair site to allow a repair to be made more easily, wherein each clamping device is provided with a stop shoulder which is adapted to engage an edge of the belt as the belt is positioned edgewise between a pair of upper and lower jaws of the device, and wherein the belt contacting portions or surfaces of the jaws are spaced inboard of the stop shoulder at least about ½ inch such that the belt edges are not clamped.

BRIEF DESCRIPTION OF THE DRAWINGS

The invention will be understood further from the drawings herein and description wherein the various structures shown in the figures are not drawn to scale or in actual proportion to each other, wherein all dimensions given therein are exemplary and no-limiting and are in inches, and wherein:

FIGS. 1 and 3 are schematics, top view and cross-section respectively, of a potential edge tear which can occur with prior art clamping devices;

FIGS. 2 and 4 are schematics of the present invention showing how to avoid tearing a conveyor belt;

FIG. 5 is a side view schematic of the use of the present invention in clamping a long, heavy conveyor belt;

FIG. 6 is a perspective view of the present lower jaw structure;

FIG. 6A is a side view of the lower jaw structure of FIG. 6 with exemplary dimensions given therein;

FIG. 7 is another perspective view of the present lower jaw structure;

FIG. 8. Is a perspective view of the present upper jaw structure with dotted lines showing the spatial connection thereof to the lower jaw structure of FIG. 7;

FIG. 9 is a view of the assembled lower and upper jaw structures of FIGS. 7 and 8, with the present clamp actuator arm in place and with a portion of the conveyor belt shown and taken in the direction 9—9 in FIGS. 7 and 8;

FIG. 10 is a view as in FIG. 9 taken in the direction 10—10 in FIGS. 7 and 8;

FIG. 11 is a cross-sectional view of a tri-planar conveyor belt showing the present clamping device clamped to the belt at an inboard edge portion thereof;

FIG. 12 is a top view of the clamped belt of FIG. 11 taken in the direction 12—12 in FIG. 11;

FIG. 13 is a side view of the present actuator arm with exemplary dimensions shown;

FIG. 14 is a top view of the pull arm taken in the direction 14—14 in FIG. 13 with exemplary dimensions shown;

FIG. 15 is a perspective view of the actuator arm;

FIG. 16 is a side view of the jaw pivot pin with exemplary dimensions shown;

FIG. 17 is a side view of the actuator arm pivot pin with exemplary dimensions shown; and FIG. 18 is a top down view of separated belt sections being pulled together by means of prior art clamping devices affixed to the edges of side sections lying to each side of a splice separation which resulted, e.g., from a broken or missing splice pin.

DETAILED DESCRIPTION

In the present invention the clamp will not put clamping pressure or excessive tensioning force at the belt edges. The theory of such clamping is exemplified in that if to tear a sheet of paper 8 (belt also) in half as shown in FIGS. 1–4, it is easy if you start the tear at one edge 10 (FIGS. 1 and 3) but it is much harder if you apply the pull force only along center portions 12 of the sheet (belt) width (FIGS. 2 and 4).

Referring to FIGS. 3, 4 and 5 the clamping members or jaws 14 and 16 are shown in cross-section and clamping the belt on each side of a repair site 22. These members may be of any convenient shape, size and material, and any type of power mechanism 18 for exerting clamping force on these members may be employed. Such mechanism can be hydraulic cylinders 20 having pistons 21 to which members 14 and 16 are affixed as shown, or electro-mechanical, electromagnetic, or purely mechanical such as opposing mechanical jacks or clamps of special construction as described below. The clamping device can be stationary at a repair station or portable (e.g., fork lift or by hand) to the repair site 22 in the stopped belt 8. Members 14 and 16 preferably are placed inwardly from the belt edges 17, for example, from about 0.5% to about 20% of the belt width "W". For most applications the most outboard portion of the clamp is spaced from about ¼ in to about 1.0 in inboard of the belt edge.

Referring further to FIGS. 6–11 and with reference to the claims herein, the present method in a preferred embodiment can be stated as the method for making a repair in the belt or splice repair (includes splice replacement or the like) at a repair site in a continuous conveyor belt which is under tension and having portions lying in a longitudinal plane, said method comprising clamping a tensioning anchor to a first inboard portion of said belt at a first longitudinal location of from about 6 in. up to about 30 feet to one side of said site, clamping a tensioning anchor to a second inboard portion of said belt at a second longitudinal location of from about 6 in. up to about 30 feet to the other side of said site, each said inboard portion starting laterally at least about ¼ inch in from an adjacent edge of said belt, connecting a tensioning device to and between said anchors and actuating said device to pull said portions closer together to relieve belt tension at said site and allowing the belt at said site to lie substantially flat, making said repair, deactuating said device to allow said first and second inboard portions to separate longitudinally and reestablish normal belt tension, and declamping said anchors from said belt.

Also with reference to FIGS. 6–11, and with reference to the claims, the present clamping device or tensioning anchor 24 comprises the major components of an upper jaw structure 26, a lower jaw structure 28 and a clamp actuator arm 30. The jaws are pivotally connected to each other by a jaw pivot pin 32. Jaw structure 28 as shown more clearly in FIGS. 6 and 7 comprises a base 34 having a bore 36 for receiving pin 32, a bearing end portion 38 and a lower jaw portion 40. Base 34 lies generally in a base plane 42, and jaw portion 40 lies generally in a jaw plane 44, which planes are shown as being normal to each other, however, depending, for example, on the type of mechanism to be employed for pulling the separated belt sections toward each other, as well as the angle of pull, planes 42 and 44 can be angled more or less than 90° with respect to each other in order to maximize the pulling power and efficiency and to minimize stress forces on the belt.

Jaw portion 40 is configured to provide a belt contact surface 46 which terminates short of the inner wall 48 of base 34 to form a gap 50 in which the most outboard edge run 52 of the belt can rest, unclamped, during the pulling together of the separated belt sections. It is noted that inner wall 48 acts as a stop for the outside or adjacent edge 49 of the belt as the anchor is being slid in over the belt edge. Also, it is preferred that the belt contact surface 54 of the upper jaw structure 26 also terminate short of inner wall 48 as shown at gap 56 to further relieve any clamping pressures on edge run 52. It is preferred that both 50 and 56 have a width of from about ¼" to about 1", most preferably from about ⅜" to about ¾", however, larger or lesser gaps can be used depending on the strength and dimensions and other such factors of the belt and pulling mechanism and the pulling distances required.

Referring particularly to FIG. 9, upper jaw structure 26 comprising a body 27 which is pivotally connected to actuator arm 30 by pin 58 and which is pivotally connected to base 34 by pin 32, is formed to provide an upper jaw 60 having the belt contact surface 54 which lies in an arc such as shown in FIG. 9, as an example, as of a radius "r" of about 2¹¹⁄₁₆ in. Such a radius can be varied depending on the general geometric and size of the clamping device. The pivot point 32 for body 27 is situated such that surface 54 is quickly and firmly cammed down against belt 8 as actuator arm 30 is actuated, i.e., pulled to the left in FIG. 9. As shown in FIG. 9, surface 54 can be roughened by a series of nubs as shown for better gripping of the belt.

As shown in FIGS. 6 and 10, the bearing end portion of base 34 is apertured at 39 and slidably receives actuator arm 30. This structure maintains surface 46 in. contact with belt 8 as arm 30 is pulled by a tensioning force.

It is preferred that the pivotal axis 33 of pin 32 be substantially parallel to the longitudinal axis 61 of the jaw members. In this regard, when the present jaw members are clamped to the belt, the axis 61 for each member is considered to run along the ridge of strengthening rib 63 of upper jaw structure 26.

In FIG. 18, pairs 62 and 64 of prior art clamping devices are clamped to edge portions of separated sections 66 and 68 of belt 8 and are being pulled longitudinally together by a ratchet type device having a ratchet body 70, handle 72, and cable 74. Of course, any type of pulling mechanism can be hooked into loop 76 or any equivalent connector of applicants actuator arm 30.

In a most preferred and detailed embodiment, the present invention comprises a tensioning anchor 24 adapted for being clamped onto an outboard edge run 52 of a conveyor belt 8 having elastomeric upper and lower surfaces, whereby a pair of said anchors can be clamped, each to a portion of said edge run 52 of adjacent separated sections 66, 68 of said belt and pulled toward each other by tensioning means to bring said separated end portions into close proximity for being joined or repaired, said anchor comprising an upper jaw member 26, a lower jaw member 28 and a pull arm 30.

The upper jaw member 26 has a generally horizontally extending upper clamp component 19 formed with a first proximal end portion 31, a first distal end portion 35, a first leading edge 37, a first trailing edge 41, a first longitudinal center line 61, and an underside longitudinally extending belt contact surface 54 having a dynamic belt contact first axis 29, i.e., the term dynamic refers to the fact that the longitudinal or axial 29 line of contact of the surface 54 of most pressure will change it lateral position depending, e.g., on belt thickness and tensioning (pull) force in arm 30.

Member 26 further has a first lever arm 65 formed with and extending generally vertically from the proximal end 31 of said upper clamp component 19 and having a pull arm pivot means 45 with a pivot axis 47, and further has a first lower pivot means 57 with a jaw connecting pivot axis 33, wherein said axes 47 and 33 each are substantially parallel to said belt contact first axis 29 and lie in a common plane 55 which is offset from said centerline 43 toward said first trailing edge 41.

The lower jaw member 28 has a generally horizontally extending lower clamp component 40 formed with a second proximal end portion 59, a second distal end portion 67, a second leading edge 69, a second trailing edge 71, a second longitudinal centerline 73, and a longitudinally extending upper side belt contact surface 46 having a dynamic belt contact axis 75, Member 28 further has a stabilizer lever arm 77 formed with and extending generally vertically from said second proximal end portion 59 and providing a belt edge 49 stop shoulder means 48. A second lower pivot means 78 is provided on said stabilizer lever arm 77 which pivot means also has the pivot axis 33. Pivot means 51, 78 pivotally interconnect said jaw members 26, 28 for pivoting the same relative to each other about said pivot axis 33. Arm 77 extends upwardly generally in a plane 53 which lies forward of said leading edges 37, 69, said arm 77 further having aperture means 39 formed through an upper portion 57 thereof generally on a dynamic pull axis 81 oriented generally normal to said first and second longitudinal center lines 43, 73.

The anchor 24 further has a pull arm means 30 slidably mounted through said aperture means 39 and having a forward pull end 9 and a rearward connector end 10, and a pivot means 58 on said connector end 10 pivotally connecting said pull arm means 30 to said upper pivot means 45 of said first lever arm 65, whereby a pull force on said forward pull end 9 will pivot said upper clamp component 19 about said pivot axis 33 relative to said lower clamp component 40 and clamp said belt between said belt contact surfaces 46, 54. A laterally extending portion of said upper side belt contact surface 46 which lies adjacent to said stop shoulder means 48 on said second lever arm has been removed to form a laterally extending gap 50 across said upper side belt contact surface 46 to prevent said upper and lower jaws from pinching the outer edge 49 of said belt and creating an edge tear site.

The invention has been described in detail with particular reference to preferred embodiments thereof, but it will be understood that variations and modifications will be effected with the spirit and scope of the invention.

I claim:

1. A tensioning anchor adapted for being clamped onto a conveyor belt having inboard and outboard edge portions, said anchor being further adapted for connection to a tensioning power mechanism whereby in cooperation with other such tensioning anchors is used for pulling separated sections of the belt toward each other for repair of the belt, said anchor comprising an upper jaw member and a lower jaw member each of which is formed with a belt contact surface, wherein said jaws are pivotally connected together whereby said jaw members and contact surfaces are adapted to be spaced apart for receiving edge portions of said belt positioned between said jaw members, actuator means engaging said jaw members and adapted to forcibly bring said jaw members together in clamping engagement with inboard edge portions of said belt while leaving adjacent outboard edge portions of said belt in substantially unpinched condition, shoulder means on said anchor adapted to engage an outermost outboard edge of said belt to limit the lateral insertion of said belt between said jaw members, and at least one of said jaw members having a non-ribbed, flat belt contact surface which is terminated at a position adjacent said shoulder means to provide a gap about ¼ in. to about 1.0 in. wide extending continuously and laterally all the way across said belt contact surface whereby said outboard edge portions of said belt will not be clamped by said jaw members.

2. The tensioning anchor of claim 1 wherein said upper one of said jaw members has a curved cam surface adapted to be brought into tight engagement with said belt upon actuation of said actuator means by a tensioning force means.

3. The tensioning anchor of claim 2 wherein said gap is from about ¼ in. to about 1.0 µm. wide and runs substantially parallel to and adjacent said shoulder means.

4. The tensioning anchor of claim 1 wherein the pivot axis of the pivot structures pivotally connecting said jaw members runs substantially parallel to the longitudinal axis of said jaw members.

5. The tensioning anchor of claim 1 wherein said shoulder means is on one of said jaw members and runs at a right angle to said longitudinal axis of said jaw members.

6. A tensioning anchor (24) adapted for being clamped onto an outboard edge run (52) of a conveyor belt (8) having elastomeric upper and lower surfaces, whereby a pair of said anchors can be clamped, each to a portion of said edge run (52) of adjacent separated sections (66),(68) of said belt and pulled toward each other by tensioning means to bring said separated end portions into close proximity for being joined or repaired, said anchor comprising an upper jaw member (26), a lower jaw member (28) and a pull arm (30), said upper jaw member (26) having a generally horizontally extending upper clamp component (19) formed with a first proximal end portion (31), a first distal end portion (35), a first leading edge (37), a first tailing edge (41), a first longitudinal center line (61), and an underside longitudinally extending belt contact surface (54) having a dynamic belt contact first axis (29), said member (26) further having a tensioning lever arm (65) formed with and extending generally vertically from the proximal end (31) of said upper clamp component (19) and having a pull arm pivot means (45) with a pivot axis (47), and further having a first lower pivot means (57) with a jaw connecting pivot axis (33), wherein said axes (47) and (33) each are substantially parallel to said belt contact first axis (29) and lie in a common plane (55) which is offset from said centerline (43) toward said first trailing edge (41), said lower jaw member (28) having a generally horizontally extending lower clamp component (40) formed with a second proximal end portion (59), a second distal end portion (67), a second leading edge (69), a second trailing edge (71), a second longitudinal centerline (73), and a longitudinally extending upper side belt contact surface (46) having a dynamic belt contact axis (75), said member (28) further having a stabilizer lever arm (77) formed with and extending generally vertically from said second proximal end portion (59) and providing a belt edge (49) stop shoulder means (48), a second lower pivot means (78) on said stabilizer lever arm (77) and also having the pivot axis (33), said pivot means (51) (78) pivotally interconnecting said jaw members (26) (28) for pivoting said jaw members relative to each other about said pivot axis (33), said arm (77) extending upwardly generally in a plane (53) which lies forward of said leading edges (37,69), said arm (77) further having aperture means (39) formed through an upper portion (57) thereof generally on a dynamic pull axis (81) oriented generally normal to said first and second longitudinal center lines (43,73), said anchor (24) further having a pull arm means (30) slidably mounted through said aperture means (39) and having a forward pull end (9) and a rearward connector end (10), a pivot means (58) on said connector end (10) pivotally connecting said pull arm means (30) to said upper pivot means (45) of said first lever arm (65), whereby a pull force on said forward pull end (9) will pivot said upper clamp component (19) about said pivot axis (33) relative to said lower clamp component (40) and clamp said belt between said belt contact surfaces (46,54), and wherein a laterally extending portion of said upper side belt contact surface (46) which lies adjacent to said stop shoulder means (48) on said second lever arm has been removed to form a laterally extending gap (50) across said upper side belt contact surface (46) to prevent said upper and lower jaws from pinching the outer edge (49) of said belt and creating an edge tear site.

7. The tensioning anchor of claim 6 wherein the belt contact surface (54) of said upper jaw (26) is curved and adapted to be brought into tight engagement with said belt in a downward camming action around pin (32) upon pull arm means (30) being pulled by a tensioning force means.

8. The tensioning anchor of claim 7 wherein said gap (50) is from about ¼ in. to about 1.0 in. wide and runs substantially parallel to said stop shoulder means (48).

9. The tensioning anchor of claim 6 wherein the pivot axis (33) of the connection between said jaw members runs substantially parallel to the dynamic belt contact axes (29) and (75) of said jaw members.

10. The tensioning anchor of claim 6 wherein said stop shoulder means (48) runs substantially at a right angle to said belt contact axis (75) and completely laterally across lower jaw member (28).

* * * * *